United States Patent Office 3,565,943
Patented Feb. 23, 1971

3,565,943
1-INDANCARBOXYLIC ACIDS AND DERIVATIVES
Peter Frederick Juby, De Witt, Richard Anthony Partyka, Liverpool, and Thomas William Hudyma, De Witt, N.Y., assignors to Bristol-Myers Company, New York, N.Y., a corporation of Delaware
No Drawing. Continuation-in-part of application Ser. No. 795,726, Jan. 31, 1969. This application Sept. 17, 1969, Ser. No. 858,870
Int. Cl. C07c *63/44, 69/76*
U.S. Cl. 260—469                                    13 Claims

ABSTRACT OF THE DISCLOSURE 5-cyclohexyl-1-indancarboxylic acids are useful anti-inflammatory agents in the treatment of inflammatory diseases in animals, including man. An example of a compound of the disclosure is 5-cyclohexyl-1-indancarboxylic acid.

CROSS-REFERENCE TO RELATED APPLICATION

This application is a continuation-in-part of our co-pending application Ser. No. 795,726 filed Jan. 31, 1969, now abandoned.

BACKGROUND OF THE INVENTION (1) Field of the invention

The compounds of the present invention relate to 5-cyclohexyl-1-indancarboxylic acids which compounds are useful non-steroidal anti-inflammatory agents.

(2) Description of the prior art

The compounds 4 - isobutylphenlacetic acid [South African Pat. 62/294 (1962)], 4-isobutyl-α-methyl-phenyl-acetic acid [S. S. Adams, E. E. Cliffe, B. Lessel, and J. S. Nicholson, J. Pharm. Sci., 56, 1686 (1967)], 3-chloro-4-cyclohexyl-α-methylphenyl-acetic acid [T. Y. Shen, Chim. Therap., II, 459, (1967)], and 5-p-methoxyphenyl-2-indancarboxylic acid [M. Minssen-Guetté, M. Dvolaitzky, and J. Jacques, Bull. Soc. Chim., France, No. 5, 2111 (1968)] have been described in the literature as being useful anti inflammatory agents.

SUMMARY OF THE AGENTS

The 5-cyclohexyl-1-indancarboxylic acid of the present invention are the compounds having the formula

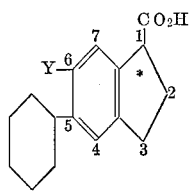

wherein Y is hydrogen, Cl, Br, F, I, OH, (lower)alkyl, mercapto, cyano, nitro, (lower)alkoxy, amino or (lower)alkylthio; or a pharmaceutically-acceptable, nontoxic salt thereof.

DISCLOSURE OF THE INVENTION

This invention relates to non-steroidal anti-inflammatory agents useful in animals, including man, which compounds are characterized by the formula

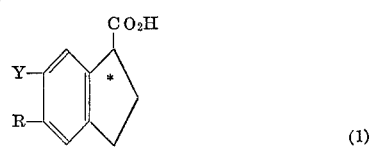

in which R is cyclohexyl,
Y is hydrogen, bromo, chloro, iodo, fluoro, mercapto, cyano, hydroxy, trifluoromethyl, (lower)alkyl, (lower)- alkoxy, nitro, amino or (lower)alkylthio; or a nontoxic, pharmaceutically-acceptable salt thereof. The carboxyl group in the compounds of the instant invention is attached to an asymmetric carbon atom (\*) such that the compounds exist in two isomeric forms, dextro- and levorotatory isomers. Both the substantially pure dextro- and levorotatory isomers of these compounds, as well as the racemic mixtures are considered to be an integral part of the invention.

It was an object of the instant invention to prepare non-steroidal anti-inflammatory agents that would be useful in the treatment of a variety of inflammatory diseases such as rheumatoid arthrities, rheumatoid spondylitis, osteoarthritis, gout and other similar afflications.

These objectives have been achieved by the provision, according to the present invention, of the compound having the formula

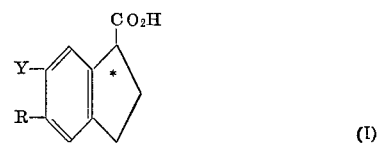

in which R is cyclohexyl; Y is H, Cl, Br, F, mercapto, —CF$_3$, OH, (lower)alkoxy, nitro, amino, cyano, (lower)- alkyl or (lower)alkylthio; or a nontoxic pharmaceutically-acceptable salt thereof.

A more limited and preferred embodiment of the present invention comprises the compound having the formula I wherein R is cyclohexyl, Y is hydrogen, chloro, fluoro, hydroxy, (lower)alkyl, (lower)alkoxy, nitro or amino; or a pharmaceutically-acceptable, nontoxic salt thereof.

A further limited and preferred embodiment of the present invention comprises the compound having the Formula I wherein R is cyclohexyl, Y is hydrogen, chloro, (lower)alkyl or (lower)alkoxy; or a pharmaceutically-acceptable, nontoxic salt thereof.

A most preferred embodiment of the present invention comprises the compound having the Formula I wherein R is cyclohexyl and Y is hydrogen or chloro; or a pharmaceutically-acceptable, nontoxic salt thereof.

Another most preferred embodiment is the levorotatory isomer having the name (—)-5-cyclohexyl-1-indancarboxylic acid.

Another most preferred embodiment is the dextrotatory isomer having the name (+)-6-chloro-5-cyclohexyl-1-indancarboxylic acid.

The pharmaceutically-acceptable, nontoxic salts include those having metallic cations such as sodium, potassium, calcium and aluminum and organic amine cations of tri-alkylamines, e.g. triethylamine, procaine, dibenzylamine, N-benzyl-β - phenethylamine, 1-ephenamine, N,N' - dibenzylethylenediamine, dehydroabietylamine, N,N' - bis-dehydroabietylethylenediamine, N - (lower) - alkyl-pi-peridines, e.g. N-ethylpiperidine, and other amines which have been used to form salts with medicinally active carboxylic acids.

The term "(lower)alkyl" as used herein means both straight and branched chain aliphatic hydrocarbon radicals having from 1 to 6 carbon atoms such as methyl, ethyl, propyl, isopropyl, butyl, isobutyl, etc. Similarly, where the term "(lower)" is used as part of the description of another group, e.g. "(lower)alwoxy," it refers to the alkyl portion of such group which is therefore as described above in connection with "(lower)alkyl" and thus includes such radicals as methoxy, ethoxy, isopropoxy, etc.

The compounds of the instant invention can be prepared by the following synthesis:

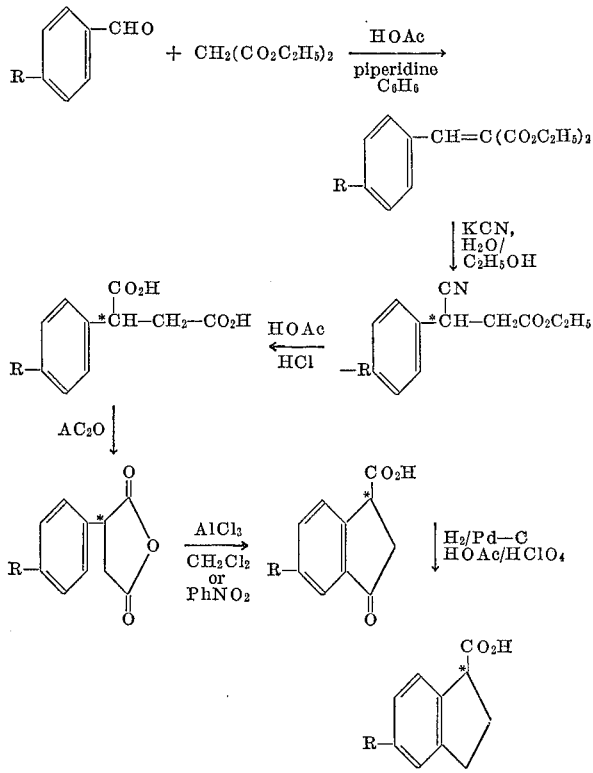

wherein R is cyclohexyl.

The optionally Y-substituted 5-cyclohexyl-1-indancarboxylic acids of the present invention can be prepared by one of the synthetic routes:

(1)(a) 6-halosubstituted-1 - indancarboxylic acids: 5-cyclohexyl-1-indancarboxylic acid in halogenated with N-halosuccinimide to produce 6-halo-5-cyclohexyl-1-indancarboxylic acids (see Example 3).

(b) 4 or 6-nitrosubstituted - indancarboxylic acids: 5-cyclohexyl-1-indancarboxylic acid is nitrated with one equivalent of nitric acid in the presence of sulfuric acid to produce a mixture of 4 and 6-nitro-5-cyclohexyl-1-indancarboxylic acids. The mixture can be resolved into pure 4-nitro-5-cyclohexyl-1-indancarboxylic acid and 6-nitro-5-cyclohexyl-1-indancarboxylic acid by methods known to the art. These resolved 6-nitrosubstituted compounds are most valuable as intermediates in the preparation of the other claimed compounds of the present invention.

(c) 6-aminosubstituted-1-indancarboxylic acids: The purified 6-nitrosubstituted indancarboxylic acids obtained in part (b) above are reduced by the use of hydrogen and catalyst (Pd/C, PtO$_2$, etc.) to produce the 6-aminosubstituted indancarboxylic acids of the present invention.

(d) 1 - indancarboxylic acid diazonium salts: The aminosubstituted compound prepared in step (c) above is placed in a strong mineral acid, i.e., HCl, H$_2$SO$_4$, HBr, etc., at 0° C. Nitrous acid is generated in situ by the addition of sodium nitrite to produce the diazonium salt of the amine.

(e) 6-hydroxy-5-cyclohexyl - 1 - indancarboxylic acid: Heating of the 6-diazonium salt obtained in step (d) after the addition of water, will result in the formation of the 6-hydroxy-5-cyclohexyl-1-indancarboxylic acid.

(f) 6-alkoxy-5-cyclohexyl - 1 - indancarboxylic acid: Heating of the 6-diazonium salt obtained in step (d) after the addition of the appropriate alcohol will result in the formation of the 6-alkoxy compound.

(g) 6-halo-5-cyclohexyl - 1 - indancarboxylic acid: The 6-diazonium salt prepared as in step (d) from the 6-aminosubstituted - 1 - indancarboxylic acid obtained in step (c) is treated with either cooper-bronze (Gattermann reaction) or cuprous halide (Cl, Br, I) to produce the 6-halosubstituted compound.

(h) 6-cyano-5-cyclohexyl-1-indancarboxylic acid: The 6-diazonium salt obtained by the procedure of step (d) which is prepared in H$_2$SO$_4$ is treated with base to neutralize the salt solution, followed by the addition of a solution of cuprous cyanide-sodium cyanide complex to produce a precipitate. Heating of the precipitate decomposes it to the cyanosubstituted acid.

(i) 6-fluoro-6-cyclohexyl-1-indancarboxylic acid: The 6-diazonium salt, as in step (g), is treated with fluoroboric acid. The fluoroborate precipitates and is collected. After washing and drying, the precipitate is heated and it decomposes to the desired 6-fluorosubstituted compound.

(j) 6 - mercapto-5-cyclohexyl-1-indancarboxylic acid: The 6-diazonium salt prepared in step (d) is treated with potassium ethyl xanthate which produces an ethyl dithiocarbonate. Saponification of the dithiocarbonate produces the desired 6-mercaptosubstituted compound.

(k) 6 - methylthio - 5 - cyclohexyl-1-indancarboxylic acid: Treatment of the 6-mercaptosubstituted compound obtained in step (j) with dimethylsulfate in the presence of a base, followed by mild hydrolysis, produces the 6-methylthiosubstituted acid.

(1) 6-methyl-5-cyclohexyl - 1 - indancarboxylic acid: The 6-bromo- or iodo-5-cyclohexyl - 1 - indancarboxylic acid obtained in step (g) is treated with lithium dimethylcopper to produce 6-methyl-5-cyclohexyl-1-indancarboxylic acid [E. J. Corey and G. H. Posner, J. Am. Chem. Soc., 89, p. 3911 (1967)].

The compounds of the instant invention can be prepared by the utilization of one or more of the disclosed procedures above and they include among others:

6-chloro-5-cyclohexyl-1-indancarboxylic acid,
6-bromo-5-cyclohexyl-1-indancarboxylic acid,
6-iodo-5-cyclohexyl-1-indancarboxylic acid,
6-fluoro-5-cyclohexyl-1-indancarboxylic acid,
6-hydroxy-5-cyclohexyl-1-indancarboxylic acid,
6-methoxy-5-cyclohexyl-1-indancarboxylic acid,
6-nitro-5-cyclohexyl-1-indancarboxylic acid,
6-amino-5-cyclohexyl-1-indancarboxylic acid,
6-cyano-5-cyclohexyl-1-indancarboxylic acid,
6-methyl-5-cyclohexyl-1-indancarboxylic acid,
6-mercapto-5-cyclohexyl-1-indancarboxylic acid, and
6-methylthio-5-cyclohexyl-1-indancarboxylic acid.

The compounds of the instant invention can be resolved into their substantially pure dextro- and levorotatory isomers by methods commonly known in the art. For illustrative purposes, the compound 5-cyclohexyl-1-indancarboxylic acid was resolved into its respective isomers by the procedure of first treating the mixture with cinchonidine to produce the cinchonidine salt of (+)-5-cyclohexyl-1-indancarboxylic acid. The salt was recrystalized and then decomposed to the free acid to yield substantially pure (+)-5-cyclohexyl-1-indancarboxylic acid.

The levorotatory acid enriched mother liquors remaining above, after the collection of the cinchonidine salt of the dextrorotatory acid was isolated from it, was concentrated to dryness. The residue was treated with ether and hydrochloric acid. A partially resolved mixture of the dextrorotatory and levorotatory isomers, enriched with the levorotatory acid, was obtained.

The enriched acid was dissolved in ethanol and treated with dehydroabietylamine. The dehydroabietylamine salt of (—)-5-cyclohexyl-1-indancarboxylic acid was collected and purified by crystallization. The salt was treated with hydrochloric acid, and extracted with ether. The ethereal solution was concentrated to dryness and substantially pure levorotatory isomer crystallized from petroleum ether. (See Example 4.)

All the compounds of the instant invention can be resolved into their component dextrorotatory and levorotatory isomers by a procedure similar, if not identical, to that described above. Examination of the chemical literature likewise provides many other methods for the resolution of racemic monocarboxylic acids.

Some racemic mixtures can be precipitated as eutectics instead of mixed crystals and can thus be quickly separated and in such cases can sometimes be selectively precipitated. The more common method of chemical resolution may be used. By this method diastereoisomers are formed from the racemic mixture by reaction with an optically-active resolving agent. Thus, an optically-active base can be reacted with the carboxyl group. The difference in solubility between the diastereoisomers formed permits the selective crystallization of one form and regeneration of the optically-active acid from the mixture. There is, however, a third method of resolving which shows great promise. This is one of the other forms of biochemical procedures using selective enzymatic reaction. Thus, the racemic acid can be subjected to an asymmetric oxidase or decarboxylase which will, by oxidation or decarboxylation, destroy one form, leaving the other form unchanged. Even more attractive is the use of hydrolylase on a derivative of the racemic mixture to form preferentially one form of the acid. Thus, esters or amides of the acids can be subjected to an esterase or amidase which will selectively saponify one enantiomorph and leave the other unchanged. Amide or salt diastereoisomers of the free acid may be formed with optically-active amines, such as quinine, brucine, cinchonidine, cinchonine, dehydroabietylamine, hydroxy-hydrindamine, menthylamine, morphine, α-phenylethylamine, phenyloxynaphthylmethylamine, quinidine, 1-fenchylamine, strychnine, basic amino acids, such as lysine, arginine, amino acid esters, and the like. Similarly, ester diastereoisomers of the free acid may be formed with optically active alcohols, such as borneol, menthol, 2-octanol and the like. Especially preferred is the use of cinchonidine to give the readily decomposable diastereoisomers salt which may then be resolved by dissolving in a solvent, such as acetone, and distilling the solvent at atmospheric pressure until crystals begin to appear and further crystallization produced by allowing the mixture to cool to room temperature, thereby separating the two enantiomorphs. The acid may then be recovered fro mthe salt by extracting the salt between an organic solvent, such as petroleum ether and dilute hydrochloric acid or some other organic solvent-aqueous system. Workup of the remaining mother liquors and subsequent purification will usually provide the other isomer.

It is noted, however, the racemic mixtures themselves are potent anti-inflammatory agents.

The compounds of this invention have a high degree of anti-inflammatory activity. They are useful in treating arthritis, rheumatism and other inflammatory diseases in mammals.

Anti-inflammatory tests of the compounds of the present invention were carried out on rats using the carrageenin-induced foot edema test of Charles A. Winter et al., "Carrageenin-Induced Edema in Hind Paw of the Rat as an Assay for Anti-Inflammatory Drugs," Proceedings of the Society for Experimental Biology and Medicine, 111, 544 (1962). The compound under investigation was given orally to the rat, and one hour later carrageenin was injected subcutaneously into one paw. Three hours later the degree of edema was measured volumetrically by fluid displacement, and compared to that of the control paw to give a result presented in terms of percentage inhibition of edema. Any result of more than 30% inhibition was greater than three times the standard deviation of the result in control animals, and thus clearly indicated anti-inflammatory activity.

In the rat paw edema test described above, the compounds of the instant invention exhibit anti-inflammatory activity deemed useful in the treatment of inflammatory diseases in mammals, including man. The compounds of the invention are generally useful in the dosage range of about 0.1 mg./kg. to about 40 mg./kg. three to four times a day.

They can be administered orally or parenterally, but preferably orally. More specifically, the compounds of the instant invention are preferentially administered in dosages in the range of about 0.2 mg./kg. to about 30 mg./kg. three to four times a day.

The dosage will vary with the particular compound of the invention. For example, ($\pm$)-5-cyclohexyl-1-indancarboxylic acid produced a 61% inhibition of edema at a dose of 128 mg./kg. Its minimum effective dose (MED) was 3.7 mg./kg. (MED is defined as the dose which produces 30% inhibition of edema) and its lethal dose in 50% of the animals ($LD_{50}$) was 287 mg./kg. The therapeutic index was 76.

($\pm$)-6-chloro-5-cyclohexyl-1-indancarboxylic acid however, was substantially more potent in producing a 62% inhibition of edema at 128 mg./kg., with an MED of 1.5 mg./kg., and $LD_{50}$ of 41 mg./kg. and a therapeutic index of 27.

Resolution of ($\pm$)-6-chloro-5-cyclohexyl-1-indancarboxylic acid into its (+) and (−) isomers showed that the dextrorotatory (+) isomer was the more potent having an MED of 0.85 mg./kg. as compared to the levorotatory isomer which had an MED of 16 mg./kg.

In the case of ($\pm$)-5-cyclohexyl-1-indancarboxylic acid, it appears the majority of the anti-inflammatory activity resides in the levorotatory isomer, (−)-5-cyclohexyl-1-indancarboxylic acid, as compared to little or none in the dextrorotatory isomer. The unresolved racemic mixture is active as such however and is useful as an anti-inflammatory agent.

The oral dosage in humans of the compounds of the present invention is in the range of about 0.2 mg./kg. to about 25 mg./kg. administered three or four times a day. The preferred human dosage is in the range of 0.2 mg./kg. to about 10 mg./kg. three to four times a day.

The carboxylic acids I of the present invention have also shown activity in rats when administered in the form of their (lower)alkyl esters or tertiary-amino (lower)alkyl esters. These compounds are also considered an integral part of the present invention.

Therefore, a preferred embodiment of the present invention are the compounds having the formula

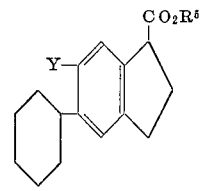

in which Y is hydrogen, chloro, bromo, fluoro, hydroxy, (lower)alkyl, (lower)alkoxy, mercapto, cyano, nitro, amino or (lower)alkylthio, $R^5$ is (lower)alkyl or a (lower)alkyl possessing a t-amine function; or a pharmaceutically acceptable salt thereof.

Another preferred embodiment are the compounds having the formula

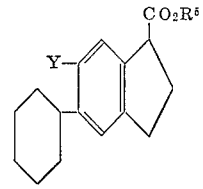

in which Y is hydrogen, chloro, fluoro, hydroxy, (lower) alkyl, (lower)alkoxy, nitro or amino, $R^5$ is (lower)alkyl or a (lower)alkyl group possessing a t-amine function; or a pharmaceutically acceptable salt thereof.

Another preferred embodiment are the compounds having the formula

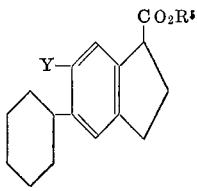

in which Y is hydrogen or chloro and $R^5$ is (lower)alkyl.

A more preferred embodiment are the compounds having the formula

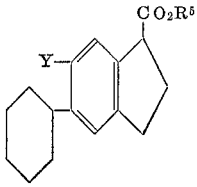

in which Y is hydrogen or chloro and $R^5$ is methyl, ethyl or propyl.

For the purpose of this disclosure, the term "(lower) alkyl possessing a t-amine function" shall mean a group consisting of up to 8 carbon atoms, which group contains a t-amine function, i.e., N,N-dimethylaminoethyl-, N,N-diethylaminoethyl-, N-methyl-4-piperidyl-, N-ethyl-4-pyrrolidyl-, N-methyl-3-pyrrolidyl-, N,N-dimethylaminopropyl-, or the like.

When the compounds of the present invention contain an ester function possessing a tertiary amine function, the compounds are capable of forming acid addition salts such as the hydrochloride, hydrobromide, hydroiodide, sulfate, sulfamate, and phosphate, and the organic acid addition salts such as the maleate, acetate, citrate, succinate, benzoate, tartrate, malate, mandelate, ascorbate and the like. All of these salts and their equivalents are a part of the invention.

DESCRIPTION OF THE PREFERRED EMBODIMENTS

Example 1

(A) p-Cyclohexylbenzaldehyde [D. Bodroux and R. Thomassin, Compt. Rend., 205, 991 (1937)]: Titanium tetrachloride [A. Rieche, H. Gross, and E. Höft, Organic Syntheses, 47, 1 (1967)] (183 ml., 316 grams, 1.67 moles) was added slowly over a period of ten minutes and with constant stirring to a cooled (ice-water solution of cyclohexylbenzene (160 grams, 1.0 mole) in methylene chloride (650 ml.). With continued stirring and cooling, dichloromethyl methyl ether (96 grams, 0.833 mole) was added dropwise over a period of 45 minutes. After the addition was complete, the mixture was stirred for thirty minutes with cooling, followed by 130 minutes at room temperature. The reaction mixture was poured onto ice. The organic layer was separated and the aqueous layer extracted with methylene chloride (3× 250 ml.). The combined methylene chloride solution was washed with water (2× 400 ml.) and dried (sodium sulfate). The dried solution was reduced to dryness in a rotary evaporator to leave a brown oil (209 grams). The oil was distilled under reduced pressure. p-Cyclohexylbenzaldehyde (81.3 grams, 52%) was collected as the fraction with B.P. 98–100°/0.2 mm. [lit. D. Bodroux and R. Thomassin, Compt. Rend., 205, 991 (1937)—B.P. 159°/10 mm.].

(B) Diethyl p-cyclohexylbenzylidenemalonate: A solution of p-cyclohexylbenzaldehyde (9.4 grams, 0.05 mole), diethyl malonate (8.01 grams, 0.05 mole), piperidine (0.5 gram), and glacial acetic acid (0.33 gram) in benzene (25 ml.) was heated under reflux for 18 hours [C. F. H. Allen and F. W. Spangler, "Organic Synthesis," coll. vol. III, John Wiley and Sons, Inc., New York, N.Y., 1963, p. 377]. The liberated water was removed from the reaction mixture as it was formed. The cooled reaction mixture was diluted with benzene (25 ml.), washed with water (2× 25 ml.) followed by 1 N hydrochloric acid (25 ml.), water (25 ml.), saturated sodium bicarbonate solution (25 ml.), and water (25 ml.). The solution was dried (sodium sulfate) and concentrated in a rotary evaporator to leave a yellow oil (17.7 g.). The product was distilled under vacuum. Diethyl p-cyclohexylbenzylidenemalonate (11.7 grams, 71%) was collected as the fraction with B.P. 172–174°/0.01 mm.

Analysis.—Calcd. for $C_{20}H_{26}O_4$ (percent): C, 72.70; H, 7.93. Found (percent): C, 72.62; H, 7.94.

(C) Ethyl 3-cyano-3-(p-cyclohexylphenyl)propionate: A solution of potassium cyanide (1.8 grams, 0.0277 mole) in water (4.5 ml.) was added quickly to a solution of diethyl p-cyclohexylbenzylidenemalonate (9.0 grams, 0.0272 mole) in 100% ethanol (90 ml.). The stirred mixture was heated by means of an oil bath maintained at about 70° for twenty hours [C. F. H. Allen and H. B. Johnson, "Organic Syntheses," coll. vol. IV, John Wiley and Sons, Inc., New York, N.Y., 1963, p. 804]. The reaction mixture was allowed to cool to room temperature. The precipitated solid was removed by filtration. The filtrate was acidified with 10% hydrochloric acid (1.5 ml.) and then concentrated in a rotary evaporator. The residue was partitioned between chloroform (150 ml.) and water (50 ml.). The chloroform layer was separated, dried (sodium sulfate) and concentrated to leave a pale yellow oil (8.1 grams) which was distilled under reduced pressure. Ethyl 3-cyano-3-(p-cyclohexylphenyl)-propionate (4.2 grams, 54%) was collected as the fraction with B.P. 160–161°/0.15 mm.

Analysis.—Calcd. for $C_{18}H_{23}NO_2$ (percent): C, 75.75; H, 8.12. Found (percent): C, 75.77; H, 8.28.

(D) p-Cyclohexylphenylsuccinic acid: A mixture of ethyl 3-cyano-3-(p-cyclohexylphenyl) - propionate (3.0 grams), glacial acetic acid (10 ml.) and concentrated hydrochloric acid (10 ml.) was heated under reflux for three hours. A crystalline solid separated from the reaction mixture which was allowed to cool slowly. The solid (1.95 grams, 67%), with M.P. 178–182°. was recrystallized from aqueous ethanol followed by ethyl acetate to give the p-cyclohexylphenyl-succinic acid as colorless crystals, M.P. 188–189° C.

Analysis.—Calcd. for $C_{16}H_{20}O_4$ (percent): C, 69.54; H, 7.30. Found (percent): C, 69.54; H, 7.36.

(E) p-Cyclohexylphenylsuccinic anhydride: A mixture of p-cyclohexylphenylsuccinic acid (10.0 grams) and acetic anhydride (50 ml.) was heated under reflux for 1.25 hours. The cooled solution was reduced to dryness in a rotary evaporator and the solid residue recrystallized from cyclohexane to give p-cyclohexylphenylsuccinic anhydride (8.8 grams, 94%) as colorless crystals, M.P. 116.5–118° C. The product was recrystallized from cyclohexane to give colorless crystals, M.P. 117–118.5° C.

Analysis.—Calcd. for $C_{16}H_{18}O_3$ (percent): C, 74.39; H, 7.02. Found (percent): C, 74.58; H, 7.24.

(F) (±)-5-cyclohexyl-3-oxo-1-indcancarboxylic acid:

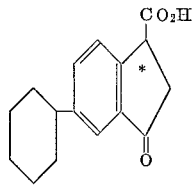

A solution of p-cyclohexylphenylsuccinic anhydride (33.0 grams, 0.128 mole) in dry methylene chloride (400 ml.) was added dropwise to a stirred, cooled (ice-water) suspension of aluminum chloride (37.4 grams, 0.281 mole) in methylene chloride (400 ml.) [H. O. House, F. J. Sauter, W. G. Kenyon, and J.-J. Riehl, J. Org. Chem., 33, 957 (1968)].

The mixture was stirred with cooling for one hour, and was then stirred at room temperature for twenty-four hours. The reaction mixture was reduced to dryness and the residue triturated with ice-water (500 ml.) and concentrated hydrochloric acid (30 ml.). The resulting gummy suspension was stirred for thirty-six hours at room temperature. The mixture was filtered and the collected off-white solid dried under vacuum. The solid was recrystallized from cyclohexane to give (±)-5-cyclohexyl-3-oxo-1-indancarboxylic acid (30.4 g., 92%) as off-white crystals, M.P. 117–118° C. A portion of the product was rechystallized (with charcoal treatment) from cyclohexane to give colorless crystals, M.P. 117–118° C.

*Analysis.*—Calcd. for $C_{16}H_{18}O_3$ (percent): C, 74.39; H, 7.02. Found (percent): C, 74.29; H, 7.23.

(G) (±)-5-cyclohexyl-1-indancarboxyl acid:

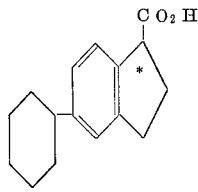

A solution of (±)-5-cyclohexyl-3-oxo-1 - indancarboxylic acid (9.0 grams) in glacial acetic acid (150 ml.) containing 60% perchloric acid (2 ml.) and 10% palladium on carbon (2.0 grams) was shaken with hydrogen (Parr hydrogenator, 3 atoms.) until no further hydrogen was absorbed. The mixture was filtered and anhydrous sodium acetate (2.5 grams) was added to the filtrate. The resulting solution was reduced to dryness. Several portions of toluene were added to the residue and after each addition the mixture was evaporated. The residue was partitioned between diethyl ether (200 ml.) and water (40 ml.). The ether layer was washed with water (40 ml.) followed by saturated aqueous sodium chloride (40 ml.), and dried (sodium sulfate). The solution was reduced to dryness to yield a buff solid which was recrystallized from Skellysolve B to give (±)-5-cyclohexyl-1-indancarboxylic acid (8.4 grams, 98.5%) as buff crystals, M.P. 145–147° C. A portion of the product was recrystallized from Skellysolve B (essentially n-hexane, B.P. 60–68° C.), with charcoal treatment, to give colorless crystals, M.P. 147–148° C.

*Analysis*—Calcd. for $C_{16}H_{20}O_2$ (percent): C, 78.65; H, 8.25. Found (percent): C, 78.58; H, 8.34.

Example 2

Sodium 5-cyclohexyl-1-indancarboxylate (±) racemic mixture: A solution of sodium 2 - ethylhexanoate (6.15 grams, 0.037 mole) in acetone (30 ml.) was added to a solution of (±)-5-cyclohexyl-1-indancarboxylic acid (9.0 grams, 0.0368 mole) in warm acetone (70 ml.). The mixture was allowed to stand and cool to room temperature. The crystalline solid (7.25 grams, 74%) that formed was collected, washed with acetone end recrystallized from methanol-acetone to give soidum 5-cyclohexyl-1-indancarboxylate as colorless crystals.

*Analysis.*—Calcd. for $C_{16}H_{19}NaO_2$ (perecent): C, 72.16; H, 7.19. Found (percent): C, 72.11; H, 7.40.

Example 3

(±)-6-chloro-5-cyclohexyl-1-indancarboxylic acid: N-chlorosuccinimide (8.2 grams, 0.0614 mole) was added to a stirred, cooled (ice-water) solution of (±)-5-cyclohexyl-1-indancarboxylic acid (10.0 grams, 0.0409 mole) in dimethylformamide (82 ml.). The solution was stirred for fifteen minutes at 0° C., thirty minutes at 25° C., nine hours at 50° C. followed by eight hours at 25° C. The solution was diluted with cold water (400 ml.) and stirred until the precipitated product turned granular (fifteen minutes). The crude product was collected, washed with cold water, and dried. Crystallization from Skellysolve B with charcoal treatment gave colorless crystals (6.65 grams, 58%), M.P. 149–150° C. The product was recrystallized twice from Skellysolve B to give (±)-6-chloro- 5-cyclohexyl-1-indancarboxylic acid as colorless crystals, M.P. 150.5–152.5° C.

*Analysis.*—Calcd. for $C_{16}H_{19}ClO_2$ (percent): C, 68.94; H, 6.87; Cl, 12.72. Found (percent): C, 69.19; H, 7.04; Cl, 12.97.

Example 4.—Resolution of (±)-5-cyclohexyl-1-indancarboxylic acid (A) (±)-5-cyclohexyl-1-indancarboxylic acid: A solution of (±)-5-cyclohexyl-1-indancarboxylic acid (15.0 grams, 0.0614 mole) and cinchonidine (9.05 grams, 0.037 mole) in absolute ethanol (700 ml.) was boiled down to a volume of about 300 ml. The mixture was allowed to cool slowly and was left for twenty hours at 25° C. The colorless crystals were collected and washed with cold ethanol to give the cinchonidine salt of (+)-5-cyclohexyl-1-indancarboxylic acid (13.0 grams), M.P. 212–212.5° C. Additional cinchonidine (1.0 gram, 0.0034 mole) was added to the mother liquors and their volume reduced to about 165 ml. by boiling. The hot solution was seeded with the salt of the (+) acid and stored at 5° C. for sixty-five hours, when an additional crop (2.4 grams) of the cinchronidine salt of the (+) acid, M.P. 211–215° C. was obtained. The mother liquors were retained for isolation of the (−) isomer.

The salt with M.P. 212–212.5° C. was recrystallized from ethanol to give colorless crystals (11.8 grams), M.P. 217.5–219° C. The product was partitioned between ether (500 ml.) and 10% aqueous hydrochloric acid (250 ml.). The ethereal layer was washed successively with 10% aqueous hydrochloric acid (250 ml.) water (2× 250 ml.) and water saturated with sodium chloride (250 ml.). The ethereal solution was dried ($Na_2SO_4$), filtered, and the filtrate reduced to dryness to give (+)-5-cyclohexyl-1-indancarboxylic acid (5.5 grams), M.P. 108–110° C. Two recrystallizations from petroleum ether (B.P. 39–50° C.), gave colorless needles, M.P. 108–109.5° C., $[\alpha]_D^{25}$ +9.60° (ethanol) and $[\alpha]_{365}^{25}$ +44.8° (ethanol)

*Analysis.*—Calcd. for $C_{16}H_{20}O_2$ (percent): C, 78.65; H, 8.25. Found (percent): C, 78.40; H, 8.27.

(B) (−)-5-cyclohexyl - 1 - indancarboxylic acid: The mother liquors from the salt formation in part (A) were reduced to dryness and the residue treated with ether and 10% aqueous hydrochloric acid as previously described for the salt of the (+) isomer and from the ethereal layer was obtained a partially resolved mixture of acids (7.6 grams), enriched in the (−) isomer, $[\alpha]_D^{25}$ −7.69° (ethanol) and $[\alpha]_{365}^{25}$ −35.4° (ethanol)

This mixture was extracted with boiling petroleum ether (B.P. 39–50° C., 3× 35 ml.) and the combined extracts were reduced in volume (50 ml.) and cooled in an ice bath. The crystalline solid (5.1 grams), M.P. 105–108° C., $[\alpha]_D^{25}$ −8.91° (ethanol) and $[\alpha]_{365}^{25}$ −41.5° (ethanol)

was collected.

The solution of this acid (5.02 grams, 0.0205 mole) and dehydroabietylamine (5.85 grams, 0.0205 mole) in ethanol (500 ml.) was boiled down to a volume of about 175 ml. and cooled to 25° C. during two hours. The dehydroabietylamine salt of (−)-5-cyclohexyl-1-indancarboxylic acid (8.7 grams), M.P. 179–181° C., was collected and recrystallized from ethanol to give colorless crystals (8.0 grams), M.P. 184–185° C. The mother liquors from the product with M.P. 179–181° C., were reduced in volume and an additional crop of salt (0.95 gram), M.P. 178.5–180.5° C., was isolated. This latter material was recrystallized from ethanol and the product (0.78 gram), M.P. 182–183° C., was combined with the main crop. The dehydroabietylamine salt (8.78 grams) was partitioned between ether (400 ml.) and 10% aqueous hydrochloric acid. The ethereal solution was washed with water (3× 150 ml.) followed by water saturated with sodium chloride (2× 100 ml.), dried ($Na_2SO_4$), and reduced to dryness to leave the (−) isomer (4.0 grams).

Recrystallization from petroleum ether (B.P. 39–50° C.) gave colorless needles (3.41 grams) of (−)-5-cyclohexyl-1-indancarboxylic acid: M.P. 108–109.5° C., $[\alpha]_D^{25}$ −9.66° (ethanol) and $[\alpha]_{365}^{25}$ −44.7° (ethanol)

*Analysis.*—Calcd. for $C_{16}H_{20}O_2$ (percent): C, 78.65; H, 8.25. Found (percent): C, 78.85; H, 8.31.

Example 5.—Resolution of (±)-6-chloro-5-cyclohexyl-1-indancarboxylic acid (A) (+)-6-chloro - 5 - cyclohexyl - 1 - indancarboxylic acid: A solution of (±)-6-chloro-5-cyclohexyl-1-indancarboxylic acid (20.0 g., 0.0719 mole) and dehydroabietylamine (10.22 g., 0.03595 mole) in absolute ethanol (700 ml.) was boiled down to a volume of about 380 ml. The mixture was allowed to cool slowly and was left for 20 hours at about 25°. The resulting crystalline solid (16.3 g.), M.P. 188–190° C., was collected and recrystallized from methanol:water (20:1) to give colorless crystals (11.0 g.), M.P. 192–194° C. Recrystallization from methanol gave colorless crystals (7.4 g.), M.P. 194–195.5° C. The salt was partitioned between diethyl ether and 1 N hydrochloric acid. The ethereal layer was washed successively with 1 N hydrochloric acid (twice), water (twice), and water saturated with sodium chloride. The ethereal solution was dried ($Na_2SO_4$) and concentrated to give (+)-6-chloro-5-cyclohexyl-1-indancarboxylic acid (3.5 g.) as colorless crystals, M.P. 133–134° C. Recrystallization from Skellysolve B gave colorless needles (3.0 g.), M.P. 135–136° C., $[\alpha]_D^{25}$ +28.7° (ethanol) and $[\alpha]_{365}^{25}$ +88.7° (ethanol)

*Analysis.*—Calcd. for $C_{16}H_{19}ClO_2$ (percent): C, 68.94; H, 6.87; Cl, 12.72. Found (percent): C, 68.94; H, 6.81; Cl, 12.64.

(B) (−)-6-chloro - 5 - cyclohexyl - 1 - indancarboxylic acid: A solution of (+)-5-cyclohexyl-1-indancarboxylic acid (8.0 g., 0.0328 mole) and N-chlorosuccinimide (6.52 g., 0.049 mole) in dimethylformamide (66 ml.) was heated, with stirring, by means of an oil bath maintained at 52–55° C. for 9 hours, followed by 32° for 10 hours. The solution was poured into water (280 ml.) and the mixture triturated with ice cooling. The resulting solid was collected, dried, and recrystallized from Skellysolve B (Norit) to give colorless crystals (3.12 g., 34%), M.P. 127–130° C. The product was recrystallized twice from petroleum ether (B.P. 30–60° C.) to give (−)-6-chloro-5-cyclohexyl-1-indancarboxylic acid as colorless crystals, M.P. 134–135° C., $[\alpha]_D^{25}$ −28.2° (ethanol) and $[\alpha]_{365}^{25}$ −87.5° (ethanol)

*Analysis.*—Calcd. for $C_{16}H_{19}ClO_2$ (percent): C, 68.94; H, 6.87; Cl, 12.72. Found (percent): C, 68.82; H, 6.86; Cl, 12.68.

Example 6

(±)-5-cyclohexyl-6-nitro - 1 - indancarboxylic acid: A mixture of concentrated sulfuric acid (670 g.) and concentrated nitric acid (42.0 g. of 70%, 0.466 mole $HNO_3$) was added, dropwise with stirring, to a cooled (ice-water) mixture of (±)-5-cyclohexyl-1-indancarboxylic acid (100.0 g., 0.409 mole) in nitromethane (1260 ml.) over a period of 70 minutes. The solution was then stirred for two hours with cooling, followed by 2.5 hours at 25°. The reaction mixture was poured onto ice. The resulting mixture was extracted with diethyl ether. The ether extract was washed with water, followed by aqueous sodium acetate, water, and saturated aqueous sodium chloride. The ether solution was then dried ($Na_2SO_4$) and concentrated. The residue was crystallized from nitromethane to give a tan solid (48.7 g.), M.P. 102–112° C. Recrystallization from benzene:Skellysolve B gave tan crystals, M.P. 112–115° C.

A portion of the product was purified by chromatography on silicic acid (Mallinckrodt CC–4, 100–200 mesh) with toluene:acetone (30:1). The product was finally recrystallized from benzene-Skellysolve B to give (±)-5-cyclohexyl-6-nitro-1-indancarboxylic acid as pale yellow crystals, M.P. 118–120° C., resolidifying and remelting at 150–151° C.

*Analysis.*—Calcd. for $C_{16}H_{19}NO_4$ (percent): C, 66.42; H, 6.62; N, 4.84. Found (percent): C, 66.75; H, 6.72; N, 4.67.

Example 7

(±)-6-amino - 5 - cyclohexyl-1-indancarboxylic acid: A solution of (±)-5-cyclohexyl-6-nitro - 1 - indancarboxylic acid (14.0 g.) in 95% ethanol (200 ml.) containing Raney nickel was shaken with hydrogen at room temperature and an initial pressure of 3.5 kg./cm.$^2$ for 2.5 hours. The catalyst was removed by filtration and the filtrate concentrated to about half volume by boiling. After addition of a small volume of water to the hot solution, the (±)-6-amino - 5 - cyclohexyl-1-indancarboxylic acid (8.9 g.) crystallized as light green crystals, M.P. 103–114° C.

Example 8

(±)-5 - cyclohexyl - 6 - hydroxy - 1 - indancarboxylic acid: A mixture (±)-6-amino-5-cyclohexyl-1-indancarboxylic acid (5.80 g., 0.0224 mole), water (50 ml.) and concentrated hydrochloric acid (50 ml.) was cooled to 0° and treated, with stirring, over a period of 45 minutes with sodium nitrite (1.70 g., 0.0246 mole) in water (5 ml.). Stirring was continued for 15 minutes at 25°, followed by 8 minutes at 80–90°. The mixture was cooled and extracted with diethyl ether. The ether solution was washed twice with water followed by saturated aqueous sodium chloride, and concentrated in a rotary evaporator. The residual gum was purified by chrmoatography on silicic acid (110 g. of Mallinckrodt CC–4, 100–200 mesh) with toluene:acetone (20:1). The product was recrystallized from benzene:Skellysolve B to give tan crystals (2.0 g.) M.P. 159–160°. The product was recrystallized twice from benzene:Skellysolve B to give (±)-5-cyclohexyl-6-hydroxy-1-indancarboxylic acid as tan crystals, M.P. 159.5–161°.

*Analysis.*—Calcd. for $C_{16}H_{20}O_3$ (percent): C, 73.82; H, 7.74. Found (percent): C, 74.00; H, 7.99.

Example 9

(±)-5-cyclohexyl - 6 - methoxy - 1 - indancarboxylic acid: A mixture of (±) - 5-cyclohexyl-6-hydroxy-1-indancarboxylic acid (4.02 g., 0.0154 mole), dimethyl sulfate (4.29 g., 0.034 mole), and potassium carbonate (8.55 g., 0.0618 mole) in acetone (45 ml.) containing 10% potassium hydroxide in methanol (1 ml.) was heated under reflux for four hours and was then allowed to stand at 25° for 17 hours. The mixture was filtered and the filtrate concentrated at a rotary evaporator. The residual red oil (5.6 g.) was purified by chromatography on silicic acid (160 g. of Mallinckrodt CC–7, 100–200 mesh) with toluene.

A mixture of the yellow oil (3.3 g.) obtained from chromatography, 1 N NaOH (25 ml.), and 95% ethanol (6 ml.) was heated under reflux for 35 minutes. The cooled solution was acidified with dilute hydrochloric acid. The precipitated crystalline solid (2.93 g.) M.P. 162–164°, was recrystallized from cyclohexane to give (±) - 5 - cyclohexyl-6-methoxy-1-indancarboxylic acid (2.72 g.) as pale yellow crystals, M.P. 167.5–169°.

*Analysis.*—Calcd. for $C_{17}H_{22}O_3$ (percent): C, 74.42; H, 8.08. Found (percent): C, 74.63; H, 8.28.

Example 10

±-5-cyclohexyl - 6 - fluoro-1-indancarboxylic acid: A suspension of (±) - 6 - amino-5-cyclohexyl-1-indancarboxylic acid (10.0 g., 0.0386 mole) in diethyl ether (70 ml.) was treated with an excess of ethereal diazomethane. The solution was filtered and the filtrate concentrated on a steam bath to give the methyl ester as an oil.

Fluoroboric acid (21.0 g. of 49%, 0.116 mole) was added to a solution of the ester in ethanol (10 ml.). To the cooled (ice-water) solution was added, with stirring,

13 isoamyl nitrite (5.0 g., 0.0425 mole) over a period of two minutes. The mixture was allowed to stand at 0° for 0.5 hour. The solution was then diluted with diethyl ether (150 ml.) and kept at −10° for 20 hours. The solid diazonium fluoroborate (9.0 g.) was collected and dried. A suspension of the diazonium salt in Skellysolve C (100 ml.) was heated under reflux for 0.5 hour. The mixture was filtered while still warm and the filtrate concentrated to give methyl (±) - 5-cyclohexyl-6-fluoro-1-indancarboxylate (6.2 g.).

A mixture of the crude ester (6.2 g.), 1 N sodium hydroxide (50 ml.), and 95% ethanol (20 ml.) was heated under reflux for 0.5 hour. The hot solution was treated with Norit and filtered. The cooled filtrate was acidified with 1 N hydrochloric acid and the precipitated material extracted into diethyl ether. The ether solution was washed twice with water followed by saturated aqueous sodium chloride, and dried ($Na_2SO_4$). The dried solution was reduced to dryness and the residue recrystallized from Skellysolve B to give pale yellow crystals (4.4 g.), M.P. 137–141°. The product was purified by chromatography on silicic acid (Mallinckrodt CC-4, 100–200 mesh) with toluene:acetone (25:1), and finally recrystallized from aqueous ethanol to give (±)-5-cyclohexyl-6-fluoro-1-indancarboxylic acid (3.5 g.) as pale yellow crystals, M.P. 143–145.5°.

Analysis.—Calcd. for $C_{16}H_{19}FO_2$ (percent): C, 73.26; H, 7.30. Found (percent): C, 72.99; H, 7.40.

Example 11

(±)-methyl 5 - cyclohexyl-1-indancarboxylate: Excess diazomethane in diethyl ether was added to a suspension of (±)-5-cyclohexyl-1-indancarboxylic acid (18.0 g.) in diethyl ether (100 ml.). The resulting solution was concentrated to an oil which slowly crystallized on standing to give a buff solid (19.5 g.), M.P. 44.5–46.5°. The product was recrystallized from methanol (Norit) to give colorless crystals (18.2 g.) M.P. 46.5–48°.

Analysis.—Calcd. for $C_{17}H_{22}O_2$ (percent): C, 79.03; H, 8.58. Found (percent): C, 78.88; H, 8.74.

Example 12

(−)-methyl 5 - cyclohexyl-1-indancarboxylate: Excess diazomethane in diethyl ether was added to an ice-cold solution of (−)-5 - cyclohexyl-1-indancarboxylic acid (6.0 g.) in diethyl ether (50 ml.). The solution was filtered and concentrated to 75 ml. The solution was washed with saturated aqueous sodium bicarbonate followed by water and saturated aqueous sodium chloride, dried ($Na_2SO_4$), and concentrated in a rotary evaporator. The residual oil was distilled to give (−)-methyl 5-cyclohexyl-1-indancarboxylate (5.6 g.) as a colorless oil, B.P. 140–150° (0.1 mm.), $[\alpha]_D^{25}$ −0.93° (benzene), and $[\alpha]_{365}^{25}$ −12.4° (benzene)

Analysis.—Calcd. for $C_{17}H_{22}O_2$ (percent): C, 79.03; H, 8.58. Found (percent): C, 78.97; H, 8.85.

Example 13

(±)-Ethyl 5-cyclohexyl-1-indancarboxylate: A solution of (±)-5-cyclohexyl-1-indancarboxylic acid (6.0 g.) in ethanol (30 ml.) containing hydrogen chloride (9.0 g.) was heated under reflux for 4.5 hours. The cooled solution was diluted with water, and the ethanol removed in a rotary evaporator. The residual aqueous mixture was extracted with diethyl ether. The ether extract was washed with aqueous sodium bicarbonate followed by water and saturated aqueous sodium chloride, dried ($Na_2SO_4$), and concentrated. The residual oil was distilled to give (±)-ethyl-5-cyclohexyl-1-indancarboxylate (5.1 g.) as a colorless oil, B.P. 141.5–142° (0.02 mm.).

Analysis.—Calcd. for $C_{18}H_{24}O_2$ (percent): C, 79.37; H, 8.88. Found (percent): C, 79.67; H, 8.94.

14

Example 14

(±)-N-methyl-4-piperidyl 5 - cyclohexyl-1-indancarboxylate hydrochloride: A solution of (±)-5-cyclohexyl-1-indancarboxylic acid (7.0 g., 0.0284 mole), thionyl chloride (3.5 g., 0.0294 mole), and dimethylformamide (3 drops) in methylene chloride (75 ml.) was heated under reflux for one hour. The solution was concentrated in a rotary evaporator. A solution of the residual oil in benzene (20 ml.) was added dropwise, with cooling, to a solution of 4-hydroxy-N-methylpiperidine (6.6 g., 0.0573 mole) in benzene (30 ml.) over a period of ten minutes. The mixture was stirred at room temperature for an additional 15 minutes. Water (25 ml.) followed by saturated aqueous sodium bicarbonate (50 ml.) was added to the mixture, which was stirred for 15 minutes. The benzene layer was separated, washed twice with water, dried ($Na_2SO_4$), and concentrated to an orange oil (9.4 g.). Hydrogen chloride gas was passed into a solution of the oil in diethyl ether (100 ml.) until no further material precipitated from solution. The supernatant ether was decanted, and the residual gum washed with fresh ether and then triturated with ether acetate to give a crystalline solid (8.5 g.), M.P. 203–206°. The product was recrystallized from nitromethane (Norit) to give (±)-N-methyl -4-piperidyl 5-cyclohexyl - 1 - indancarboxylate hydrochloride as an off-white solid, M.P. 207–210°.

Analysis.—Calcd. for $C_{20}H_{29}NO_2HCl$ (percent): C, H, 8.54; Cl, 9.38; N, 3.71. Found (percent): C, 69.93; H, 8.65; Cl, 9.25; N, 3.88.

Example 15

(±)-β-dimethylaminoethyl 5-cyclohexyl - 1 - indancarboxylate hydrochloride: In a manner similar to that described in Example 14, (±)-β-dimethylaminoethyl 5-cyclohexyl-1-indancarboxylate hydrochloride was prepared from (±)-5-cyclohexyl-1-indancarboxylic acid (7.0 g., 0.0284 mole), thionyl chloride (3.5 g., 0.0294 mole), β-dimethylaminoethanol (5.1 g., 0.0573 mole) and hydrogen chloride. The crude hydrochloride (8.7 g.) was recrystallized from ethyl acetate to give off-white crystals, M.P. 148–150°.

Analysis.—Calcd. for $C_{20}H_{29}NO_2HCl$ (percent): C, 68.25; H, 8.59; N, 3.63. Found (percent): C, 67.90; H, 8.76; N, 3.85.

What is claimed is:

1. A compound having the formula

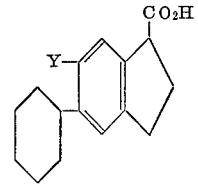

wherein Y is hydrogen, chloro, bromo, fluoro, hydroxy, (lower)alkyl, (lower)alkoxy, mercapto, cyano, nitro, amino or (lower)alkylthio; or a nontoxic pharmaceutically-acceptable salt thereof.

2. A compound of claim 1 wherein Y is hydrogen, chloro, fluoro, hydroxy, (lower)alkyl, (lower)alkoxy, nitro or amino; or a pharmaceutically-acceptable nontoxic salt thereof.

3. A compound of claim 1 wherein Y is hydrogen, chloro, (lower)alkyl or (lower)alkoxy; or a pharmaceutically-acceptable, nontoxic salt thereof.

4. The compound of claim 1 wherein Y is hydrogen; or a pharmaceutically-acceptable, nontoxic salt thereof.

5. The essentially pure levorotatory isomer of the compound of claim 4.

6. The essentially pure dextrorotatory isomer of the compound of claim 4.

7. (±)-6-chloro-5-cyclohexyl-1-indancarboxylic acid.

8. The essentially pure dextrorotatory isomer of the compound of claim 7.

9. The essentially pure levorotatory isomer of the compound of claim 7.

10. A compound having the formula

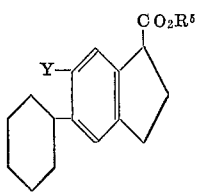

in which Y is hydrogen, chloro, bromo, fluoro, hydroxy, (lower) alkyl, (lower)alkoxy, mercepto, cyano, nitro, amino or (lower)alkylthio, $R^5$ is a radical selected from the group comprising (lower)alkyl, N,N-di(lower)alkyl-amino(lower)alkyl-, N-(lower)alkyl-4-piperidyl-, N-(lower)alkyl-4-pyrrolidyl- or N-(lower)alkyl-3-pyrrolidyl; or a pharmaceutically acceptable salt thereof.

11. A compound of claim 10 wherein Y is hydrogen, chloro, fluoro, hydroxy, (lower)alkyl, (lower)alkoxy, nitro or amino.

12. A compound of claim 10 wherein Y is hydrogen or chloro and $R^5$ is (lower)alkyl.

13. A compound of claim 10 wherein Y is hydrogen or chloro and $R^5$ is methyl, ethyl or propyl.

References Cited

Minssen et al.: Bull. Soc. Chim., France, No. 5, 2111 (1968).

JAMES A. PATTEN, Primary Examiner

U.S. Cl. X.R.

260—141, 283, 284, 285, 294, 343.7, 346.8, 448, 465, 470, 471, 472, 473, 475, 501.11, 501.2, 515, 516, 520, 599; 424—308, 309, 310, 315, 316, 317, 319